Feb. 18, 1930.  E. J. KOLODZIEJ  1,747,306
SHOCK ABSORBER
Filed Aug. 13, 1926
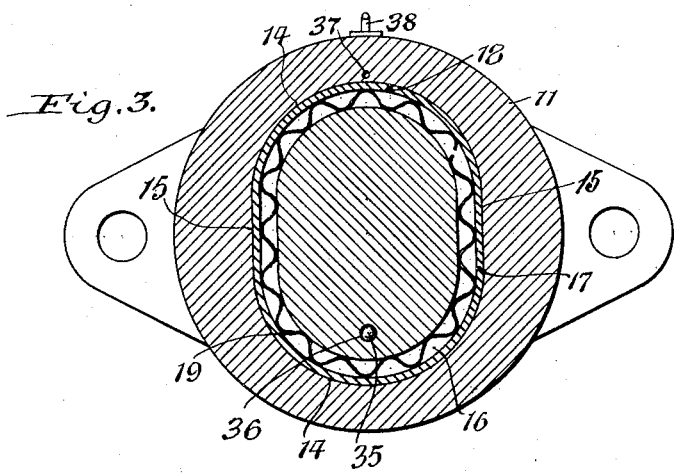
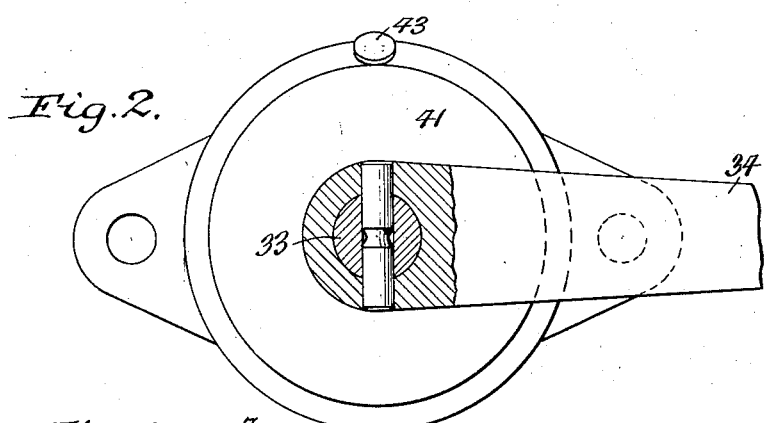
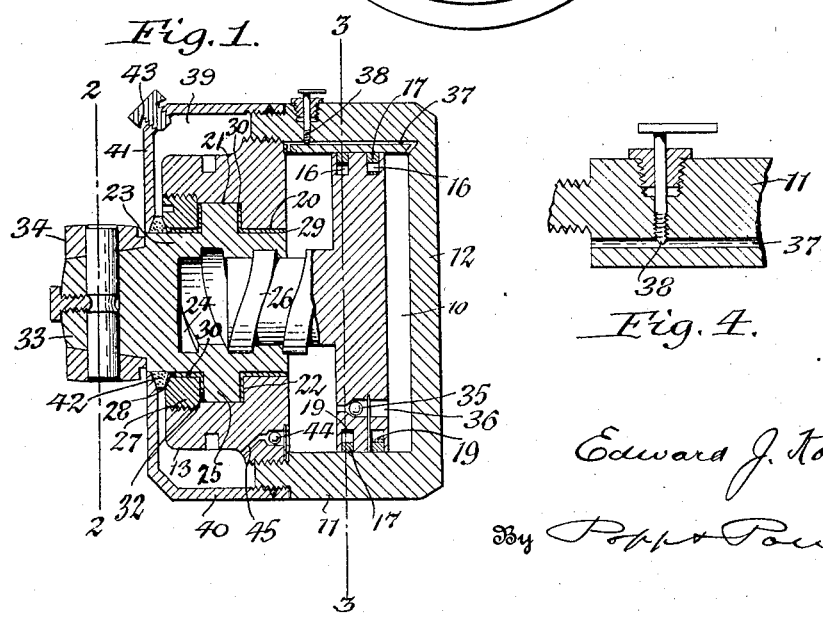
Inventor
Edward J. Kolodziej
By Popp & Powers
Attorneys Patented Feb. 18, 1930

1,747,306

UNITED STATES PATENT OFFICE

EDWARD J. KOLODZIEJ, OF BUFFALO, NEW YORK

SHOCK ABSORBER

Application filed August 13, 1926. Serial No. 128,966.

This invention relates to a shock absorber of the type which utilizes liquid as a medium for cushioning the shock on automobiles and in which a piston is reciprocated in a chamber by a screw action but its use can be extended to other fields where similar conditions exist.

One of the objects of this invention is to so construct the pressure chamber and the piston which reciprocates therein that no separate means are required to prevent these parts from turning relative to each other during the operation of the screw actuating mechanism.
Another object of this invention is to improve the bearing whereby the screw nut is journaled on the outer head of the pressure chamber.

In the accompanying drawings:—
Fig. 1 is a vertical longitudinal section of an improved shock absorber. Figs. 2 and 3 are vertical transverse sections taken on the corresponding numbered lines in Fig. 1. Fig. 4 is a fragmentary enlarged section showing the controlling valve mechanism for regulating the action of the shock absorber.

Similar characters of reference indicate like parts in the several figures of the drawings.
The numeral 10 represents the pressure chamber which is adapted to contain a fluid resisting medium such as oil. This chamber is formed within a body or wall 11 which has a rear head 12 preferably formed integrally therewith, and front head 13 connected with the body by a screw joint. During the operation of this shock absorber the piston is reciprocated lengthwise by the action of a screw mechanism in the pressure chamber and therefore displaces the liquid therein so as to cushion the shock between the relatively movable parts with which the chamber and piston are connected. During such movement the piston is held against turning without the aid of separate parts this being accomplished by making the chamber and piston of non-circular form in cross section.

In the preferred construction the chamber is oblong, the opposite ends 14, 14 of this oblong are curved in the form of semi-cylinders, while the intermediate sides 15, 15 which connect these curved ends are straight and parallel, as shown in Fig. 3. Owing to this formation the piston is positively held against turning but is free to move lengthwise in the chamber without binding or producing any undue friction or wear on the co-operating surfaces of these parts, thereby reducing the cost of manufacture as well as the up-keep of this apparatus. A practically tight joint is produced between the periphery of this piston and the bore of this chamber for preventing undue leakage by providing a packing which in its preferred form is constructed as follows:

The periphery of the piston is provided with one or more circumferential grooves 16, preferably two as shown in Fig. 1. In each of these grooves is arranged an oblong packing ring 17 which corresponds in form to the periphery of the piston and the bore of the chamber and is constructed of a strip of metal which is split at one point. as shown at 18, so that it can be expanded freely and bear firmly against the bore of the chamber. This expansion of the packing ring is preferably effected by a spring 19 of serpentine form within the groove 16 and bearing with its inner side against the bottom of the groove and with its outer side against the inner side of the packing ring. This form of spring possesses the requisite resilience to permit of inserting the packing ring in the groove and still exert sufficient pressure to hold the packing ring against the bore of the chamber and take up any wear between them. The screw mechanism for actuating the piston is constructed as follows.

Arranged centrally within the front head of the chamber is a bearing opening which has a rear part 20 of small diameter and a front part 21 of large diameter forming a forwardly facing shoulder 22 between these parts of this bearing opening. Journaled in this bearing opening is a rotary screw nut 23 which is provided with an internal screw thread 24 and an external annular flange 25 facing the shoulder 22 of the bearing opening. Projecting forwardly from the central part of the piston is an externally threaded screw stem 26 which works in the thread of the screw nut 23 so that by rocking the latter the piston will be moved back and forth in the chamber. Facing the front side of the screw flange is a retaining ring 27 which has a screw connection with the front part of the chamber and provided on its front part with an internal annular bead 28 which surrounds the screw nut in front of its flange. For the purpose of reducing the wear between the screw nut and the front head of the chamber and also permitting of conveniently replacing the worn surfaces when required, front and rear bearing rings of L-shape are provided. The rear bearing ring consists of a longitudinal cylindrical body 29 arranged between the small inner part of the bearing opening and the adjacent rear part of the screw nut and a radial flange 30 projecting laterally from the front end of this body and arranged between the rear side of the nut flange 25 and the shoulder 22 of the bearing opening. The front bearing ring consists of a longitudinal cylindrical body 31 arranged between the bore of the retaining ring 27 and the adjacent front part of the screw nut and engaging its front end against the bead 28, and a radial flange 32 projecting laterally from the rear end of the body 31 and arranged between the front side of the nut flange 25 and the rear side of the retaining ring. By this means a tight joint is maintained between the nut and front head which will prevent leakage and yet provide a bearing for the nut which will permit the latter to turn freely without liability of becoming loose or rattling.

On the front side of the screw nut the same is provided with a shank 33 to which is secured a rock arm 34. This arm and the parts forming the pressure chamber are secured to the two relatively movable parts which are to be cushioned, for example the axle and frame of an automobile. The parts are so organized that when the frame and axle approach each other the piston will be moved forwardly and when the axle and frame separate or rebound from each other then the piston moves rearwardly or inwardly. This forward and backward movement of the piston is resisted by liquid in the chamber, thereby cushioning or absorbing the shock.

Inasmuch as the shock to be absorbed is greater during a rebound action of the car than during a compression action on the spring means are provided which permit a comparatively free flow of fluid from the front to the rear end of the chamber during a compression movement of the frame toward the axle but a restricted flow of the same in the opposite direction during a rebound action. This effect is preferably attained by a check valve 35 arranged in a port 36 in the piston so as to open this port during a forward movement of the piston and close the same during a rearward movement of the same.

For the purpose of permitting the flow of liquid from one end of this chamber to the other to be regulated in accordance with the load imposed in the same, the character of the liquid which is used as the resisting medium and other conditions, a by-pass 37 is provided in the wall of the chamber which opens into opposite ends thereof and which can be regulated as to capacity by a valve 38 of the needle type having a screw connection with the chamber wall so that it can be moved to a greater or lesser extent across the by-pass for obtaining the desired rate of flow through the same.

For the purpose of replenishing the pressure chamber with resisting liquid when required a supply tank or reservoir 39 is provided in front of the pressure chamber which supply tank is preferably formed by a cylindrical body 40 connected at its rear end with the front end of the pressure chamber wall and a head 41 arranged at the front end of the body 40 and surrounding the front end of the actuating screw nut. A packing 42 is interposed between the head 41 and the retaining ring to prevent leakage. This tank is fitted through an opening in top which is normally closed by a plug 43 and liquid is permitted to flow from this tank to the front end of the pressure chamber but not in a reverse direction by a check valve 44 arranged in a port or passage 45 at the lower part of the front head of the pressure chamber, as shown in Fig. 1.

As a whole this shock absorber consists of few parts, all of which are of simple construction and capable of being manufactured at low cost.

Moreover this absorber is very efficient in operation, the same will operate with a minimum of wear, and leakage is not likely to occur so that replenishing of the oil supply is only required at infrequent intervals.

I claim:—

A shock absorber comprising a pressure chamber provided with front and rear heads, said front head being provided with a bearing opening the inner part of which is of small diameter and the outer part of large diameter forming an outwardly facing shoulder therebetween, a rotary screw nut journaled in said opening and provided with an annular flange the inner side of which faces said shoulder, a retaining ring having a screw connection with said front head and provided on its outer part with an internal annular bead surrounding the outer part of said screw nut, an inner bearing ring of L-shape in cross section having a longitudinal cylindrical body and a radial rim, said cylindrical body being arranged between the inner part of said nut and the small inner part of said bearing opening and said rim being arranged between said shoulder on the front head and the inner side of the flange on said nut, an outer bearing ring of L-shape in cross section having a longitudinal cylindrical body and a radial rim, said last mentioned body being arranged between the outer part of said nut and the bore of the retaining ring and engaging said bead and said first mentioned rim being arranged between the outer side of said flange and said retaining ring, a piston arranged in said pressure chamber, and a screw stem projecting forwardly from said piston and working in said screw nut.

In testimony whereof he affixes his signature.

EDWARD J. KOLODZIEJ.